United States Patent

Beeston et al.

(10) Patent No.: US 7,567,886 B2
(45) Date of Patent: Jul. 28, 2009

(54) METHOD TO VALIDATE SYSTEM CONFIGURATION IN A DATA STORAGE AND RETRIEVAL SYSTEM

(75) Inventors: Ralph Thomas Beeston, Tucson, AZ (US); Joel Kenneth Lyman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/054,142

(22) Filed: Feb. 8, 2005

(65) Prior Publication Data

US 2005/0149644 A1    Jul. 7, 2005

Related U.S. Application Data

(62) Division of application No. 09/837,133, filed on Apr. 18, 2001, now Pat. No. 6,854,052.

(51) Int. Cl.
G06F 11/34 (2006.01)
G06F 17/00 (2006.01)

(52) U.S. Cl. .................. 702/182; 702/185; 702/186; 714/47

(58) Field of Classification Search ......... 702/182–185, 702/57, 117–123, 186
See application file for complete search history.

(56) References Cited

U.S. PATENT DOCUMENTS

| | | | |
|---|---|---|---|
| 5,506,995 A * | 4/1996 | Yoshimoto et al. | 710/107 |
| 5,640,541 A * | 6/1997 | Bartram et al. | 703/26 |
| 5,890,014 A * | 3/1999 | Long | 710/8 |
| 5,956,301 A * | 9/1999 | Dimitri et al. | 369/30.31 |
| 6,338,006 B1 * | 1/2002 | Jesionowski et al. | 700/214 |
| 6,591,213 B1 * | 7/2003 | Burlison | 702/119 |
| 6,629,170 B1 * | 9/2003 | Davidson et al. | 710/100 |
| 6,904,480 B1 * | 6/2005 | Hobbs et al. | 710/107 |
| 7,031,778 B2 * | 4/2006 | Hsiung et al. | 700/29 |
| 2002/0052706 A1 * | 5/2002 | Odaohhara et al. | 702/119 |
| 2002/0077782 A1 * | 6/2002 | Fruehling et al. | 702/185 |
| 2002/0099875 A1 * | 7/2002 | Locklear et al. | 710/2 |
| 2006/0031621 A1 * | 2/2006 | Riley et al. | 710/305 |

* cited by examiner

*Primary Examiner*—Hal D Wachsman
(74) *Attorney, Agent, or Firm*—Dale F. Regelman; Quarles & Brady LLP

(57) ABSTRACT

A data storage and retrieval system is disclosed which includes encoded information regarding known valid system configurations, nominal performance specifications for various I/O devices, and nominal performance specifications for various interconnecting communication buses. A method is disclosed to validate the apparent configuration of the data storage and retrieval system. A method is disclosed to evaluate the performance of each I/O device and interconnecting bus disposed within the data storage and retrieval system.

20 Claims, 6 Drawing Sheets

METHOD TO VALIDATE SYSTEM CONFIGURATION IN A DATA STORAGE AND RETRIEVAL SYSTEM

RELATED APPLICATION

This application is a Divisional Application of the application having Ser. No. 09/837,133 filed Apr. 18, 2001, now U.S. Pat. No. 6,854,052.

FIELD OF THE INVENTION

The present invention relates to a method to validate the configuration of a data storage and retrieval system.

BACKGROUND OF THE INVENTION

The last ten years have witnessed a ten-thousand fold increase in computer performance. At the same time, requirements are increasing for more robust, highly available, disaster-tolerant computing resources. Nevertheless, computing resources continue to be pushed to their limits, with performance problems often traceable to the connectivity and performance of input/output subsystems.

A wide variety of input/output (I/O) devices with various performance capabilities may be included in a data storage and retrieval system. Examples of I/O devices include keyboards, pointing devices, scanners, disk drives, CD-ROM drives, printers, display monitors, local area network (LAN) adapters, FAX/modem boards, sound boards, etc. I/O devices are produced by many different manufacturers and come in various models with varying operational characteristics. The number of possible combinations of I/O devices in a data storage and retrieval system may be very large.

In order for the components of a data storage and retrieval system to function together properly and optimally, system configuration information is provided during the power-on self-test (POST) and system initialization routines executed when the system is first powered-up or reset. The system configuration information is used to initialize the various components of the system. Device registers are set, device parameters are loaded, interrupt vectors are created, etc. Computer operating system and/or other system management software is then configured in accordance with the system configuration information.

A "bus" in a digital computer system is a circuit consisting of parallel conductors for interconnecting major components of a digital computer which transfers electric signals from one component connected to the bus to another component connected to the bus. Buses of various different types are present in virtually every digital computer. One particular bus, called the Small Computer System Interface ("SCSI") bus, is used widely for coupling to a digital computer various I/O devices, e.g. disk drives, Digital Audio Tape ("DAT") drives, Compact Disk Read Only Memory ("CD ROM") drives, optical storage drives, printers, scanners, and even photo-composers.

The SCSI bus is a local Input/Output ("I/O") bus that can be operated over a wide range of data rates. The primary object of the SCSI bus interface is to provide host computers with device independence within a class of devices. Accordingly, different disk drives, tape drives, printers, optical media drives, and other devices can be added to a host computer without requiring modifications to generic system hardware or software. Standards have been adopted which specify different types of SCSI buses, e.g. the SCSI-1 and, SCSI-1I standards. A key object of the SCSI-1I standard is providing compatibility with those SCSI-1 devices that support bus parity, and that conform to level 2 of the SCSI-1 standard. In practical terms such compatibility means many different SCSI-1 devices operate properly if connected to a SCSI-1I bus despite differences between the SCSI-1 and SCSI-1I standards.

The SCSI bus is a parallel, multimaster I/O bus which has been widely adopted for use in digital computer systems since the American National Standards Institute ("ANSI") approved the SCSI-1 standard. The first SCSI standard, now known as SCSI-1, was adopted in 1986. A SCSI-1 bus interconnects at speeds of 5 MB/sec up to 8 logical units, i.e. host bus adapters or peripheral controllers, each unit can, in turn, have up to 8 logical subunits for a total of 64 logical subunits.

Since that time, SCSI has been refined and extended numerous times, with the introduction of Fast SCSI (SCSI-2) at 10 MB/sec., Fast Wide SCSI (SCSI-2), running at 20 MB/sec., and Ultra SCSI (SCSI-3 or Fast-20), which provide data transfer rates of up to 40 MB/sec. Overall, SCSI performance has doubled approximately every five years since the original standard was released in 1986, and the number of devices permitted on a single bus has been increased to 16. At the same time, a large measure of backward compatibility has been achieved, enabling newer devices to coexist on a bus with older devices.

Electrically, SCSI bus signal lines connecting devices can be either single-ended, wherein each signal's logic level is determined in relationship to a common electrical ground, or differential, wherein each signal's logic level is determined between pairs of conductors without reference to a common electrical ground. A single-ended SCSI bus may be up to 18 feet long. Alternatively, a differential SCSI bus may be up to 75 feet long.

The SCSI-2 standard, which evolved from the SCSI-1 standard, makes numerous changes from the SCSI-1 standard including establishment of a standard way for powering SCSI bus terminators, and two optional performance enhancements to increase the amount of data which can be transferred across a SCSI-2 bus during an interval of time. These two optional performance enhancements are fast SCSI which permits up to 10,000,000 transfers across the bus per second, and "wide" SCSI which permits parallel transfer of either 16 or 32 bits at a time as an alternative to the SCSI-1 limitation of transferring only 8 bits in parallel at any instant in time.

Each SCSI bus device that includes its own separate enclosure includes two SCSI bus connectors, unless the device is specifically designed for connection at only the end of the SCSI bus. If such a two connector SCSI bus device connects to one end or the other of the bus, a SCSI bus cable connects to one or the other of these connectors. If the device has an internal terminator which generally can be enabled by a switch, usually located on the outside of the device's enclosure, nothing connects to the device's second connector. Conversely, if the device lacks an internal terminator, a SCSI bus terminator will be installed on the device's second connector. If a SCSI device having two connectors is installed anywhere along the length of the bus other than at an end of the bus, then different SCSI bus cables connect to each of the connectors. In this way, the SCSI bus electrically "daisy chains" through all the devices connected to the bus except those devices connected at one end or the other of the SCSI bus.

To provide host bus adapters capable of fully exploiting the range of device capabilities permitted by the SCSI-2 standard, terminators in modem SCSI bus host bus adapters must be configurable to work properly when connected to devices designed for use with either the "narrow" SCSI-1 bus, which transfers only 8 bits at any instant in time, or with the "wide" SCSI-2 bus, which transfers 16 bits at each instant in time.

Moreover, most host bus adapters also include at least two SCSI connectors, one for connecting to SCSI devices within the same enclosure as the host bus adapter, and another for connecting to SCSI devices residing in a separate enclosure. Consequently, the SCSI-2 bus standard permits connecting wide SCSI devices to one of a host bus adapter's connectors and narrow SCSI devices to another connector of the host bus adapter. Moreover, even if a host bus adapter provides only wide SCSI bus connectors, SCSI bus cables are available which mate with the wide SCSI bus connector at one end, while the cable's other end mates with a narrow SCSI bus connector of a narrow SCSI bus device. Under any of these circumstances, the host bus adapter may be electrically located in the middle of a narrow SCSI-1 bus while concurrently being located at one end of the additional signal lines of a wide SCSI-2 bus. If this occurs, the SCSI bus host bus adapter must be capable of providing proper termination for that portion of the wide SCSI-2 bus which exceeds the narrow SCSI-1 bus.

A SCSI bus host bus adapter may, and frequently does, include more than two SCSI connectors to facilitate connecting to both narrow and wide SCSI bus cables. For example, the host bus adapter may include a wide SCSI-2 connector for connecting to SCSI devices residing in an enclosure separate from that in which the host bus adapter resides, and a pair of connectors for connecting to SCSI devices located within the same enclosure as the host bus adapter. Because a SCSI bus must be terminated, and because a SCSI bus may have only two terminators; only two connectors of a host bus adapter having three or more connectors may be connected to devices only by one or by two connectors with any additional connectors remaining unused.

To permit configuring the terminators included in a host bus adapter properly for its location either at one end or intermediate the ends of a SCSI bus, and/or for concurrent operation both with narrow and with wide SCSI bus devices regardless of its location along the SCSI bus; host bus adapters frequently include switches or jumpers which, prior to operating the host bus adapter, must be adjusted to accommodate the actual configuration of SCSI devices included in a computer system. Since a host bus adapter manufacturer cannot adjust the adapter's switches or jumpers, that task must be left to the individual who configures, or re-configures, a digital computer system that includes a SCSI host bus adapter.

Fibre Channel ("FC") is an industry-standard, high-speed serial data transfer interface that can be used to connect systems and storage in point-to-point or switched topologies. Fibre Channel Arbitrated Loop (FC-AL), developed with storage connectivity in mind, is a recent enhancement to the standard that supports copper media and loops containing up to 126 devices, or nodes. FC-AL loops are hot-pluggable and tolerant of failures.

The FC standard supports bandwidths of 133 Mb/sec., 266 Mb/sec., 532 Mb/sec., 1.0625 Gb/sec., and 4 Gb/sec. (proposed) at distances of up to ten kilometers. Gigabit Fibre Channel's maximum data rate is 100 MB/sec. (200 MB/sec. full-duplex) after accounting for overhead.

In addition to its strong channel characteristics, Fibre Channel also provides powerful networking capabilities, allowing switches and hubs to enable the interconnection of systems and storage into tightly-knit clusters. These clusters will be capable of providing high levels of performance for file service, database management, or general purpose computing. Because it is able to span up to 10 kilometers between nodes, Fibre Channel will allow the very high speed movement of data between systems that are greatly separated from one another.

The FC standard defines a layered protocol architecture consisting of five layers, the highest defining mappings from other communication protocols onto the FC fabric. The various SCSI-1, -2, and -3, protocols discussed above may be mapped onto the FC fabric.

While the preceding specifications regarding SCSI/FC buses and bus termination is readily understood by those who design I/O devices and host bus adapters, system users may not comprehend the principles required for properly adjusting the switches or jumpers included in a host bus adapter. Moreover, the choice between singled ended and differential cabling for SCSI devices adds yet another complexity which must be addressed by someone configuring a digital computer system that includes a SCSI host bus adapter. The potential for confusion is increased by the fact that cables which visually appear identical may, in fact, be quite different electrically with one cable being useful only with a single-ended SCSI bus devices while the other cable being useful with either a single-ended or a differential SCSI bus devices.

Therefore, the complexity of properly terminating a SCSI bus combined with the complexity of selecting and properly installing the right SCSI cable frequently causes great difficulty for individuals configuring, or re-configuring, digital computer systems that include a SCSI bus. Such difficulties can be particularly exasperating if the system user lacks suitable and comparatively expensive SCSI bus diagnostic equipment that might assist in resolving precisely why a data storage and retrieval system that includes a SCSI bus fails to operate properly, or to operate at all.

SUMMARY OF THE INVENTION

Applicants' invention includes a method to validate the configuration of Applicants' data storage and retrieval system. Applicants' method includes the steps of mapping the one or a plurality of input/output devices, generating an apparent system configuration, comparing that apparent system configuration with each of the known valid system configurations, and assigning one of those known valid system configurations.

Applicants' method further includes an embodiment wherein the selected system configuration is used to evaluate the performance of each I/O device connected to a host computer, and to evaluate the performance of each bus disposed within Applicants' system. This embodiment includes the steps of providing to each I/O device via one or more buses, singly or in combination, a series of connect, disconnect, and data transfer commands; receiving information from each I/O device via one or more buses, singly or in combination; analyzing that information; and evaluating the performance of each I/O device and each interconnecting bus disposed within Applicants' system.

Applicants' invention further includes a data storage and retrieval system comprising at least one host computer, one or more input/output devices, at least one communication bus connecting the host computer to each of the one or more input/output devices, and first information comprising one or more known valid system configurations. Applicants' data storage and retrieval system further includes a computer useable medium having computer readable program code disposed therein for implementing Applicants' method to validate the configuration of the data storage and retrieval system.

Applicants' invention further includes a computer program product usable with a programmable computer processor having computer readable program code embodied therein for validating the configuration of a data storage and retrieval system. In certain embodiments of Applicants' invention, Applicants' computer program product further includes computer readable program code embodied therein for evaluating the performance of each I/O device and each interconnecting bus disposed within Applicants' system.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
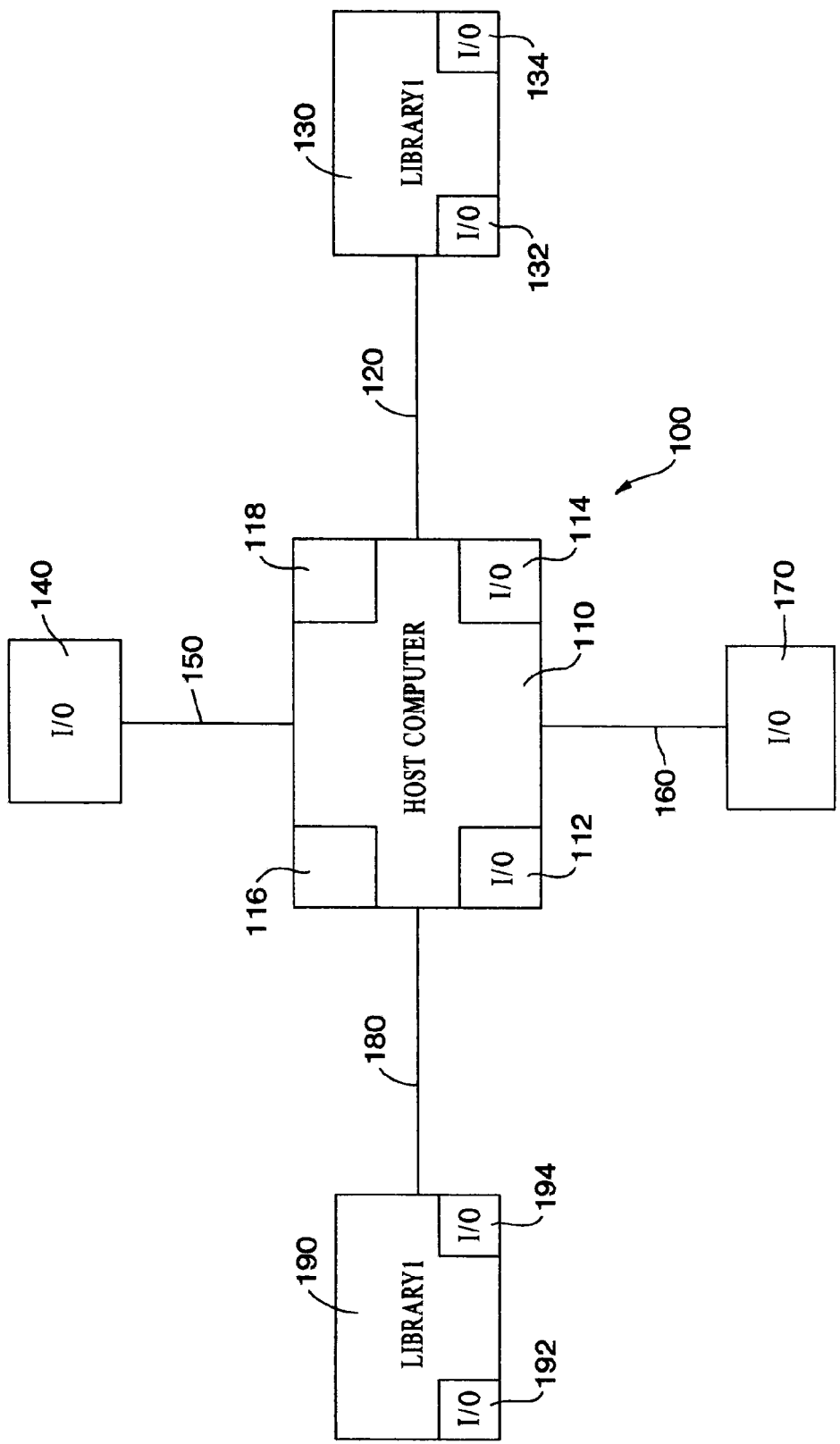
FIG. 1 is a block diagram showing the components of a typical data storage and retrieval system.

Turning to FIG. 1, data storage and retrieval system 100 includes host computer 110, first library 130, second library 190, first standalone I/O device 140, and second standalone I/O device 170. Host computer 110 includes I/O devices 112, 114, 116, and 118. Such I/O devices include, keyboards, pointing devices, scanners, disk drives, CD-ROM drives, printers, display monitors, local area network (LAN) adapters, FAX/modem boards, sound boards, Digital Audio Tape ("DAT") drives, optical storage drives, printers, scanners, photo-composers, and the like.

In certain embodiments, some or all of devices 112, 114, 116, and 118 comprise multi-ported devices which are interconnected to a plurality of communication buses. In certain embodiments, device 116 comprises a visual display device. In certain embodiments, device 118 comprises a printer.

First library 130 includes I/O devices 132 and 134. First library includes a plurality of data storage media disposed in a plurality of portable data storage cartridges which are stored in a plurality of storage slots. One or more robotic accessors retrieve, transport, and insert these portable data storage cartridges in one or more data storage drives, such as I/O devices 132 and/or 134, located within first library 130. U.S. Pat. No. 5,956,301 teaches such an automated data storage library and is hereby incorporated by reference.

Communication link 120 connects first library 130 and host computer 110. Communication link comprises any suitable bus communication path or paths between host computer 110 and library 130. For example, communication link 120 comprises a SCSI-1 interface, a SCSI-2 interface, a SCSI-3 interface, a Fibre Channel interface, and combinations thereof.

Second library 190 includes I/O devices 192 and 194. Second library includes a plurality of data storage media disposed in a plurality of portable data storage cartridges which are stored in a plurality of storage slots. One or more robotic accessors retrieve, transport, and insert these portable data storage cartridges in one or more data storage drives, such as I/O devices 192 and/or 194, located within first library 130. Communication link 180 connects second library 130 and host computer 110. Communication link 180 comprises any suitable bus communication path or paths between host computer 110 and library 190. For example, communication link 180 comprises a SCSI-1 interface, a SCSI-2 interface, a SCSI-3 interface, a Fibre Channel interface, and combinations thereof.

Data storage and retrieval system further includes standalone I/O devices 140 and 170. Communication links 150 and 160 connect I/O devices 140 and 170, respectively, to host computer 110. Communication links 150 and 160 comprise any suitable bus communication path or paths between host computer 110 and devices 140 and 170, respectively. For example, communication link 150 and communication link 160 each comprise a SCSI-1 interface, a SCSI-2 interface, a SCSI-3 interface, a Fibre Channel interface, and combinations thereof.

Figure 2:
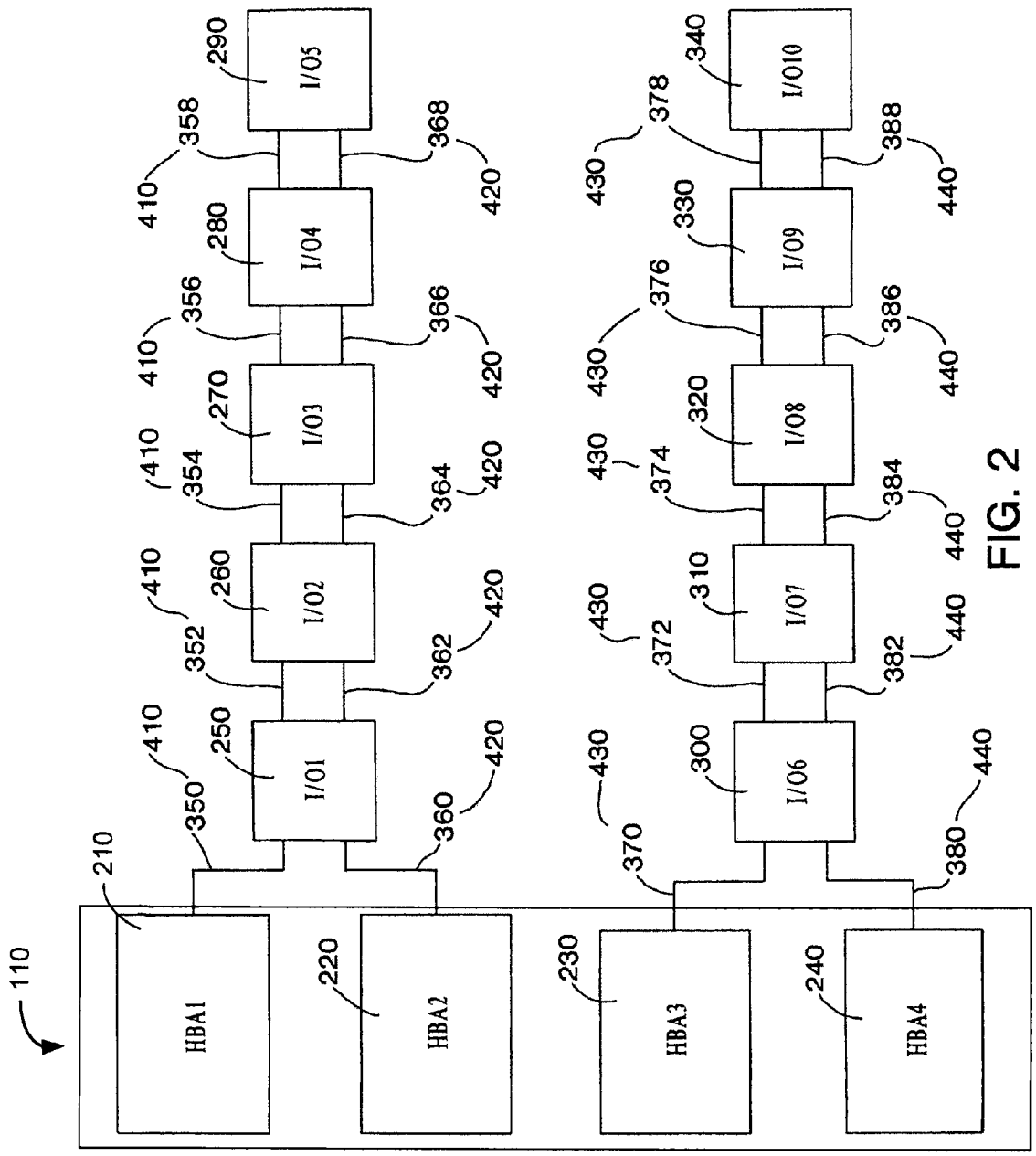
FIG. 2 is a block diagram showing the interconnectivity of a data storage and retrieval system which includes four host bus adapters and ten input/output devices.

Referring to FIG. 2, host computer 110 (FIG. 1) further includes first host bus adapter 210, second host bus adapter 220, third host bus adapter 230, and fourth host bus adapter 240. First bus 410 connects first host bus adapter 210 with I/O devices 250, 260, 270, 280, and 290. First bus includes communication links 350, 352, 354, 356, and 358. Communication link 350 comprises any suitable bus communication path or paths between first host bus adapter 210 and I/O device 250. For example, communication link 350 comprises a SCSI-1 interface, a SCSI-2 interface, a SCSI-3 interface, a Fibre Channel interface, and combinations thereof. Communication link 352, in combination with communication link 350, comprises any suitable bus communication path or paths between first host bus adapter 210 and I/O device 260. For example, communication link 352 comprises a SCSI-1 interface, a SCSI-2 interface, a SCSI-3 interface, a Fibre Channel interface, and combinations thereof.

Communication link 354, in combination with communication links 350 and 352, comprises any suitable bus communication path or paths between first host bus adapter 210 and I/O device 270. For example, communication link 354 comprises a SCSI-1 interface, a SCSI-2 interface, a SCSI-3 interface, a Fibre Channel interface, and combinations thereof. Communication link 356, in combination with communication links 350, 352, and 354, comprises any suitable bus communication path or paths between first host bus adapter 210 and I/O device 280. For example, communication link 356 comprises a SCSI-1 interface, a SCSI-2 interface, a SCSI-3 interface, a Fibre Channel interface, and combinations thereof. Communication link 358, in combination with communication links 350, 352, 354 and 356, comprises any suitable bus communication path or paths between first host bus adapter 210 and I/O device 290. For example, communication link 358 comprises a SCSI-1 interface, a SCSI-2 interface, a SCSI-3 interface, a Fibre Channel interface, and combinations thereof.

Second bus 420 connects second host bus adapter 220 with I/O devices 250, 260, 270, 280, and 290. Second bus includes communication links 360, 362, 364, 366, and 368. Communication link 360 comprises any suitable bus communication path or paths between second host bus adapter 220 and I/O device 250. For example, communication link 360 comprises a SCSI-1 interface, a SCSI-2 interface, a SCSI-3 interface, a Fibre Channel interface, and combinations thereof. Communication link 362, in combination with communication link 360, comprises any suitable bus communication path or paths between second host bus adapter 220 and I/O device 260. For example, communication link 362 comprises a SCSI-1 interface, a SCSI-2 interface, a SCSI-3 interface, a Fibre Channel interface, and combinations thereof.

Communication link 364, in combination with communication links 360 and 362, comprises any suitable bus communication path or paths between second host bus adapter 220 and I/O device 270. For example, communication link 364 comprises a SCSI-1 interface, a SCSI-2 interface, a SCSI-3 interface, a Fibre Channel interface, and combinations thereof. Communication link 366, in combination with communication links 360, 362, and 364, comprises any suitable bus communication path or paths between second host bus adapter 220 and I/O device 280. For example, communication link 366 comprises a SCSI-1 interface, a SCSI-2 interface, a SCSI-3 interface, a Fibre Channel interface, and combinations thereof. Communication link 368, in combination with communication links 360, 362, 364 and 366, comprises any suitable bus communication path or paths between second host bus adapter 220 and I/O device 290. For example, communication link 368 comprises a SCSI-1 interface, a SCSI-2 interface, a SCSI-3 interface, a Fibre Channel interface, and combinations thereof.

Third bus 430 connects third host bus adapter 230 with I/O devices 300, 310, 320, 330, and 340. Third bus includes communication links 370, 372, 374, 376, and 378. Communication link 370 comprises any suitable bus communication path or paths between third host bus adapter 230 and I/O device 300. For example, communication link 370 comprises a SCSI-1 interface, a SCSI-2 interface, a SCSI-3 interface, a Fibre Channel interface, and combinations thereof. Communication link 372, in combination with communication link 370, comprises any suitable bus communication path or paths between third host bus adapter 230 and I/O device 310. For example, communication link 372 comprises a SCSI-1 interface, a SCSI-2 interface, a SCSI-3 interface, a Fibre Channel interface, and combinations thereof.

Communication link 374, in combination with communication links 370 and 372, comprises any suitable bus communication path or paths between third host bus adapter 230 and I/O device 320. For example, communication link 374 comprises a SCSI-1 interface, a SCSI-2 interface, a SCSI-3 interface, a Fibre Channel interface, and combinations thereof. Communication link 376, in combination with communication links 370, 372, and 374, comprises any suitable bus communication path or paths between third host bus adapter 210 and I/O device 330. For example, communication link 376 comprises a SCSI-1 interface, a SCSI-2 interface, a SCSI-3 interface, a Fibre Channel interface, and combinations thereof. Communication link 378, in combination with communication links 370, 372, 374 and 376, comprises any suitable bus communication path or paths between third host bus adapter 230 and I/O device 340. For example, communication link 378 comprises a SCSI-1 interface, a SCSI-2 interface, a SCSI-3 interface, a Fibre Channel interface, and combinations thereof.

Fourth bus 440 connects fourth host bus adapter 240 with I/O devices 300, 310, 320, 330, and 340. Fourth bus 440 includes communication links 380, 382, 384, 386, and 388. Communication link 380 comprises any suitable bus communication path or paths between fourth host bus adapter 240 and I/O device 300. For example, communication link 380 comprises a SCSI-1 interface, a SCSI-2 interface, a SCSI-3 interface, a Fibre Channel interface, and combinations thereof. Communication link 382, in combination with communication link 380, comprises any suitable bus communication path or paths between fourth host bus adapter 240 and I/O device 310. For example, communication link 382 comprises a SCSI-1 interface, a SCSI-2 interface, a SCSI-3 interface, a Fibre Channel interface, and combinations thereof.

Communication link 384, in combination with communication links 380 and 382, comprises any suitable bus communication path or paths between fourth host bus adapter 240 and I/O device 320. For example, communication link 384 comprises a SCSI-1 interface, a SCSI-2 interface, a SCSI-3 interface, a Fibre Channel interface, and combinations thereof. Communication link 386, in combination with communication links 380, 382, and 384, comprises any suitable bus communication path or paths between fourth host bus adapter 240 and I/O device 330. For example, communication link 386 comprises a SCSI-1 interface, a SCSI-2 interface, a SCSI-3 interface, a Fibre Channel interface, and combinations thereof. Communication link 388, in combination with communication links 380, 382, 384 and 386, comprises any suitable bus communication path or paths between fourth host bus adapter 240 and I/O device 340. For example, communication link 388 comprises a SCSI-1 interface, a SCSI-2 interface, a SCSI-3 interface, a Fibre Channel interface, and combinations thereof.

Host computer 110 includes first information which comprises one or more system configurations which are known to be "valid." By a "valid configuration," Applicants mean a system configuration wherein all the requisite system settings and parameters, such as device identifiers, device switches, device protocols, system interrupts, and the like, are set such that the performance of each I/O device connected to the system is acceptable. In certain embodiments, this first information includes nominal performance specifications for certain I/O devices and interconnecting buses.

In certain embodiments, this first information is encoded in read-only, non-volatile memory disposed within host computer 110. In alternative embodiments, this first information is encoded within host computer 110 such that any modifications to such first information requires entry of one or more authorizing passwords.

Figure 3:
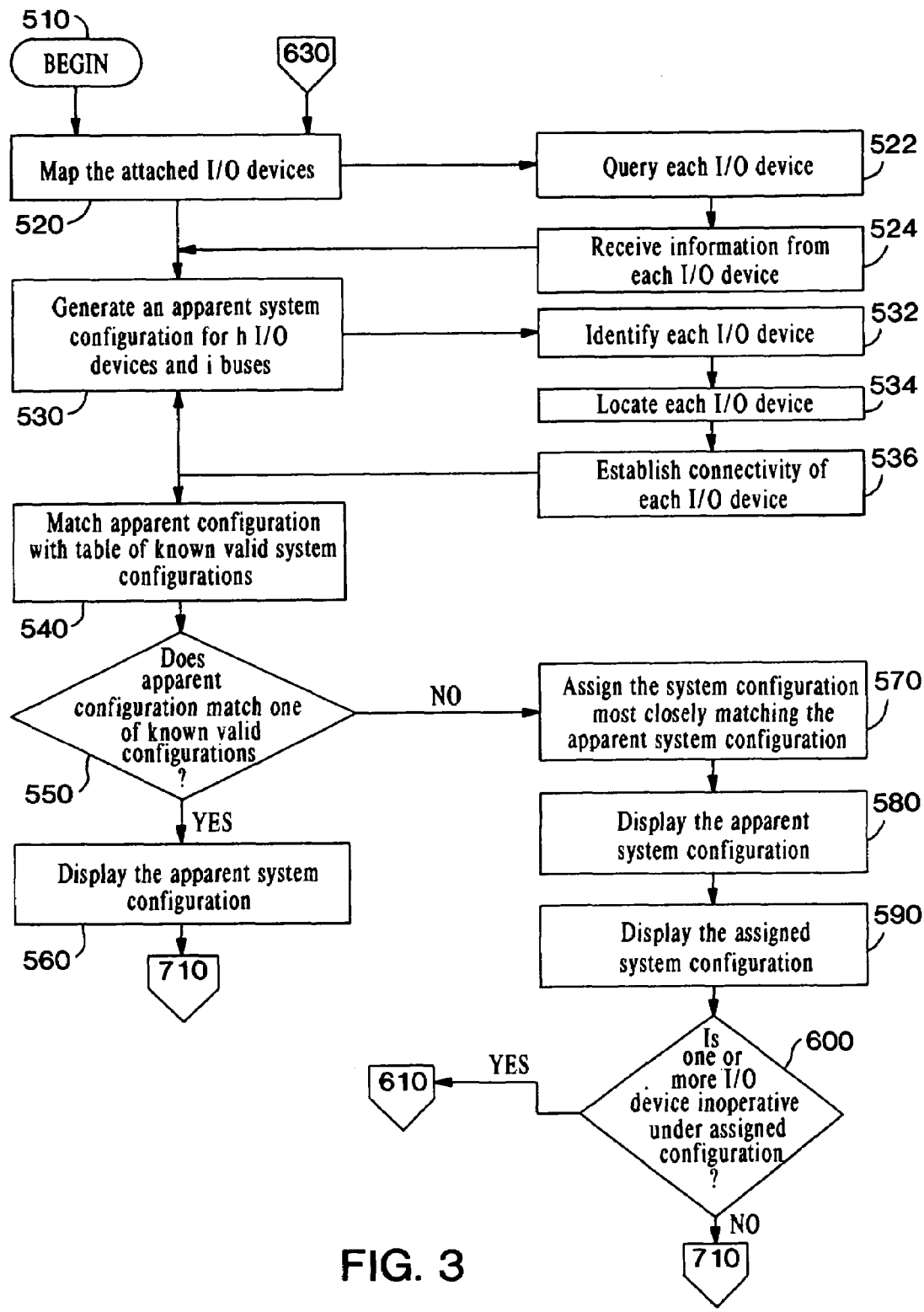
FIG. 3 is a flow chart summarizing the steps in Applicants' method to assign a valid configuration to a data storage and retrieval system.

The initial steps in Applicants' method to validate a system configuration for a data storage and retrieval system are shown in FIG. 3. Applicants' method begins at step 510. Step 510 is automatically invoked upon system start-up. In addition, the system user can initiate a call in step 510 to validate the system configuration. In step 520, the host computer 110 (FIG. 1) maps all I/O devices, such as devices 112, 114, 132, 134, 140, 192, and 194 (FIG. 1), connected to host computer 110. Step 520 further includes step 522 wherein host computer 110 sends a query to each connected I/O device via each bus connected to host computer 110, such as first bus 410, second bus 420, third bus 430, and fourth bus 440 (FIG. 2).

In step 524, host computer 110 receives second information from each I/O device on the system. This second information includes the identity of each reporting I/O device, the location of each I/O device, the type of each I/O device, certain anticipated performance characteristics of each I/O device, and the connectivity of each I/O device, i.e. which one or more buses interconnect with each I/O device.

In step 530, host computer 110 generates an apparent system configuration based upon the second information received from the various I/O devices responding to the query call. This apparent system configuration includes the total number "h" of I/O devices responding, and the total number "i" of operative buses.

In step 540, host computer 110 compares the apparent system configuration with the first information to determine if the apparent configuration matches one of the known valid system configurations. In making this comparison, host computer 110 matches the data points comprising the apparent configuration, i.e. the number of I/O devices found, the number of buses found, the identities of each device found, and the identities of each operative port of each I/O device, to a table of one or more known valid configurations. If, for example, a known valid configuration included ten (10) data points and an apparent configuration included eight (8) of those data points, the comparison between the apparent configuration and the known valid configuration would return an eighty percent (80%) match.

In certain embodiments, host computer includes one or more visual display devices, such as visual display device 116 (FIG. 1). If the apparent configuration matches a known valid configuration, then in step 560 host computer 110 displays the apparent system configuration. In certain embodiments, host computer 110 visually displays in text form the apparent system configuration on visual display device 116 (FIG. 1). In certain embodiments, host computer 110 displays the apparent system configuration in a graphical form on visual display device 116. In certain embodiments, host computer 110 prints the apparent system configuration in text form using printer 118 (FIG. 1). In certain embodiments host computer 110 prints the apparent system configuration in graphical form using printer 118.

If the apparent configuration does not match a known valid configuration, then in step 570 host computer 110 assigns one of the one or more known valid configurations as the operative system configuration. That selected configuration comprises the best match between the apparent system configuration and the known valid systems configurations. In steps 580 and 590, host computer 110 displays the apparent system configuration and the operative system configuration.

In certain embodiments, host computer 110 visually displays in text form the apparent system configuration and the selected system configuration on visual display device 116 (FIG. 1). In certain embodiments, host computer 110 displays in graphical form the apparent system and the selected system configuration on visual display device 116. In certain embodiments, host computer 110 prints in text form the apparent system configuration and the selected system configuration using printer 118 (FIG. 1). In certain embodiments host computer 110 prints in graphical form the apparent system configuration and the selected system configuration using printer 118.

In step 600, host computer 110 determines if one or more I/O devices are inoperative under the selected system configuration. In the event host computer 110 determines there are no inoperative I/O devices under the selected configuration, then Applicants' method loops to step 710 wherein host computer 110 evaluates the performance of each I/O device using the selected system configuration.

Figure 4:
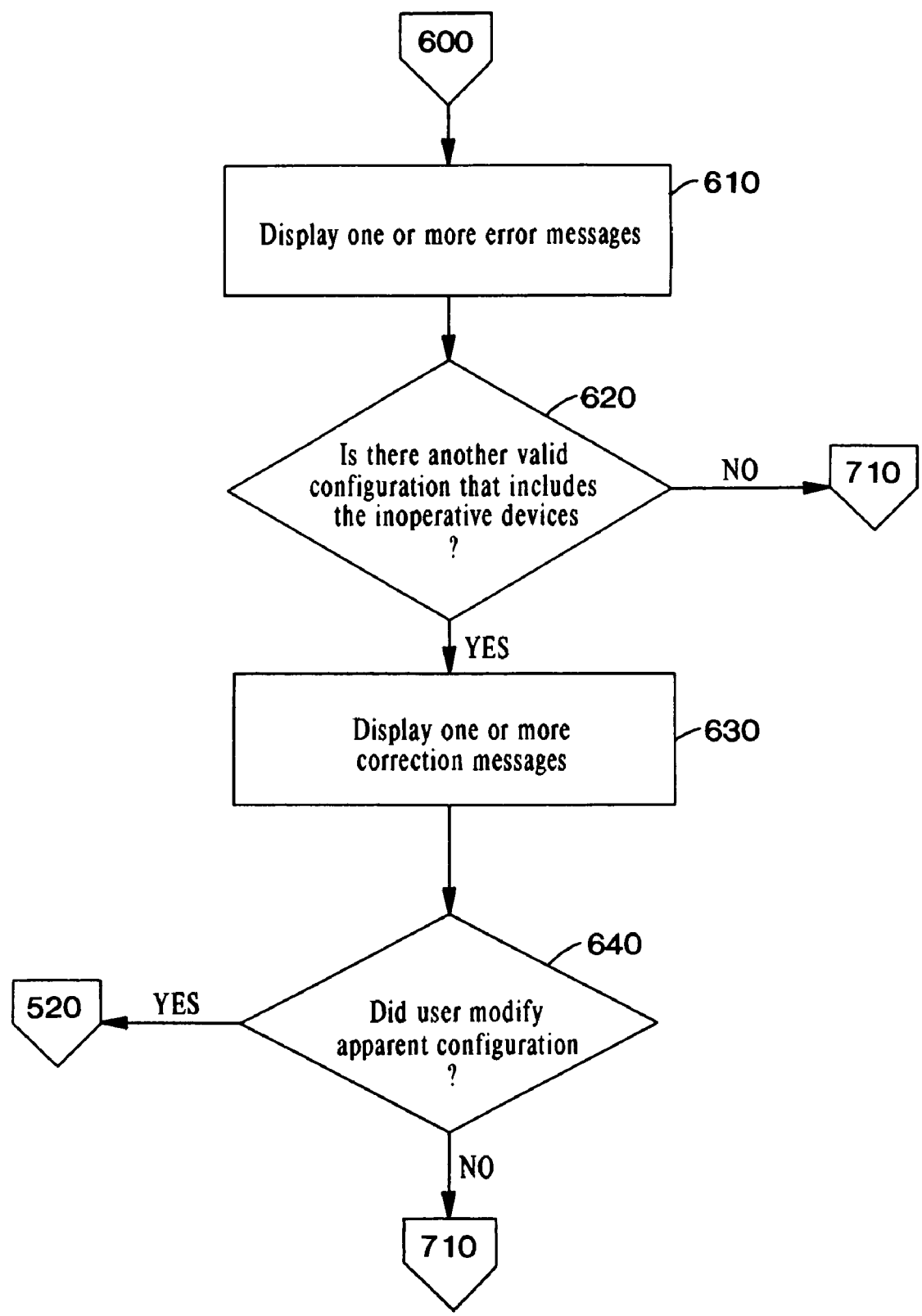
FIG. 4 is a flow chart summarizing additional steps in Applicants' method to assign a valid configuration to Applicants' data storage and retrieval system.

On the other hand, if host computer 110 determines there are one or more inoperative I/O devices using the selected system configuration, then in step 610 (FIG. 4) host computer 110 displays one or more error messages. Such error messages are visually displayed in text form using display device 116 (FIG. 1), and/or printed in text form using printer 118 (FIG. 1).

In step 620, host computer 110 examines its first information to determine whether that first information includes an alternate valid system configuration that includes the I/O devices inoperative under the selected configuration. If host computer 110 finds no such alternative valid configuration, then Applicants' method loops to step 710 wherein host computer 110 evaluates the performance of each operative I/O device and bus disposed within the system. On the other hand, if host computer 110 determines that an alternative valid configuration exists which includes the presently-inoperative I/O devices, then in step 630 host computer 110 displays/prints one or more correction messages identifying that alternative valid configuration and instructions to modify the current apparent configuration to match that alternative valid configuration.

In step 640, host computer 110 queries the user to determine if the user modified the present apparent configuration. In the event the user elects not to modify the present apparent configuration to match an alternative valid configuration, then Applicants' method loops to step 710 wherein host computer 110 evaluates using the selected system configuration the performance of each operative I/O device and bus. If, however, the user indicates that the present apparent system configuration was modified, then Applicants' method loops to step 520 to validate the modified system configuration.

Figure 5:
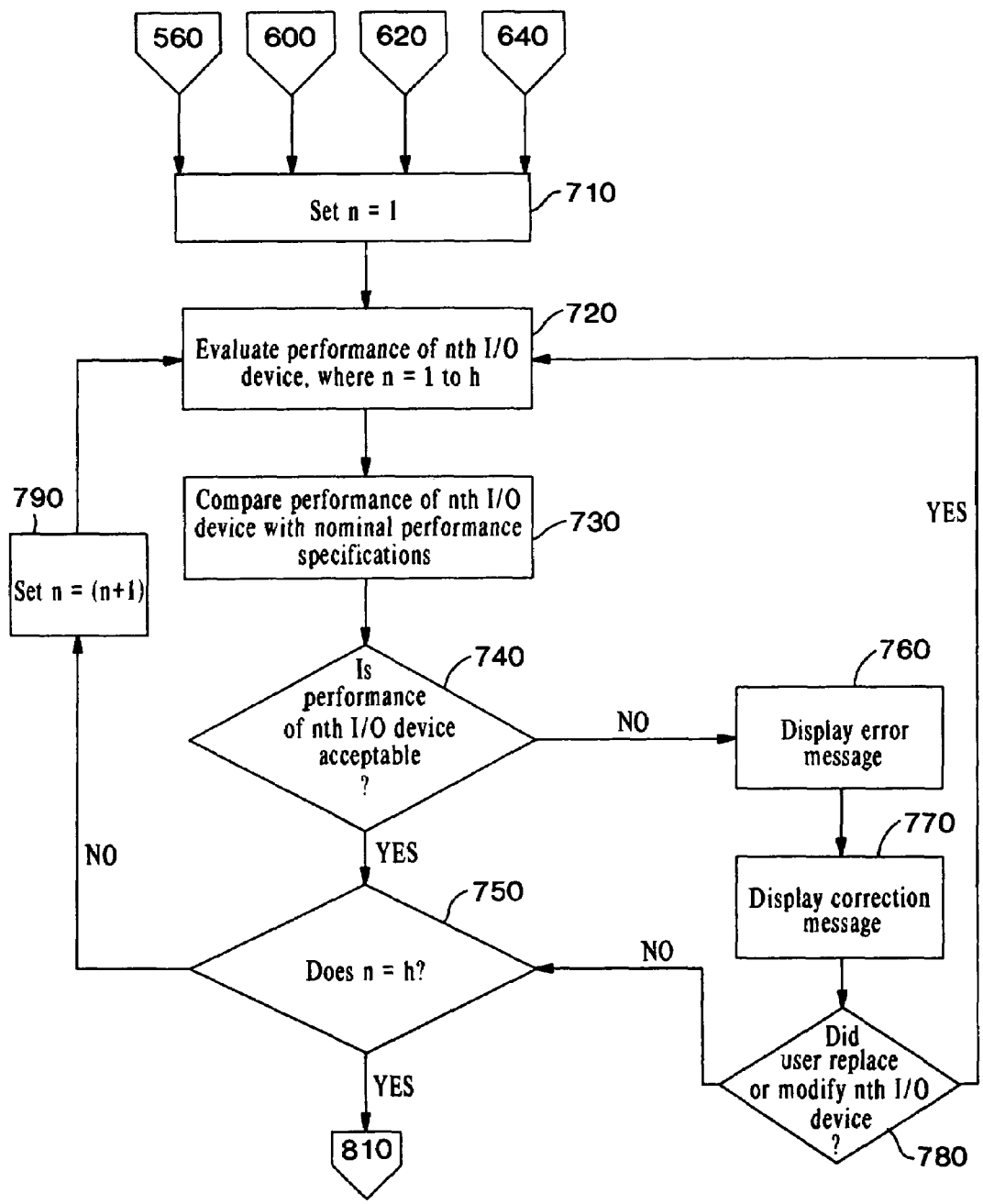
FIG. 5 is a flow chart summarizing the steps in Applicants' method to evaluate using the selected system configuration the performance of each I/O device disposed within Applicants' data storage and retrieval system.
Figure 6:
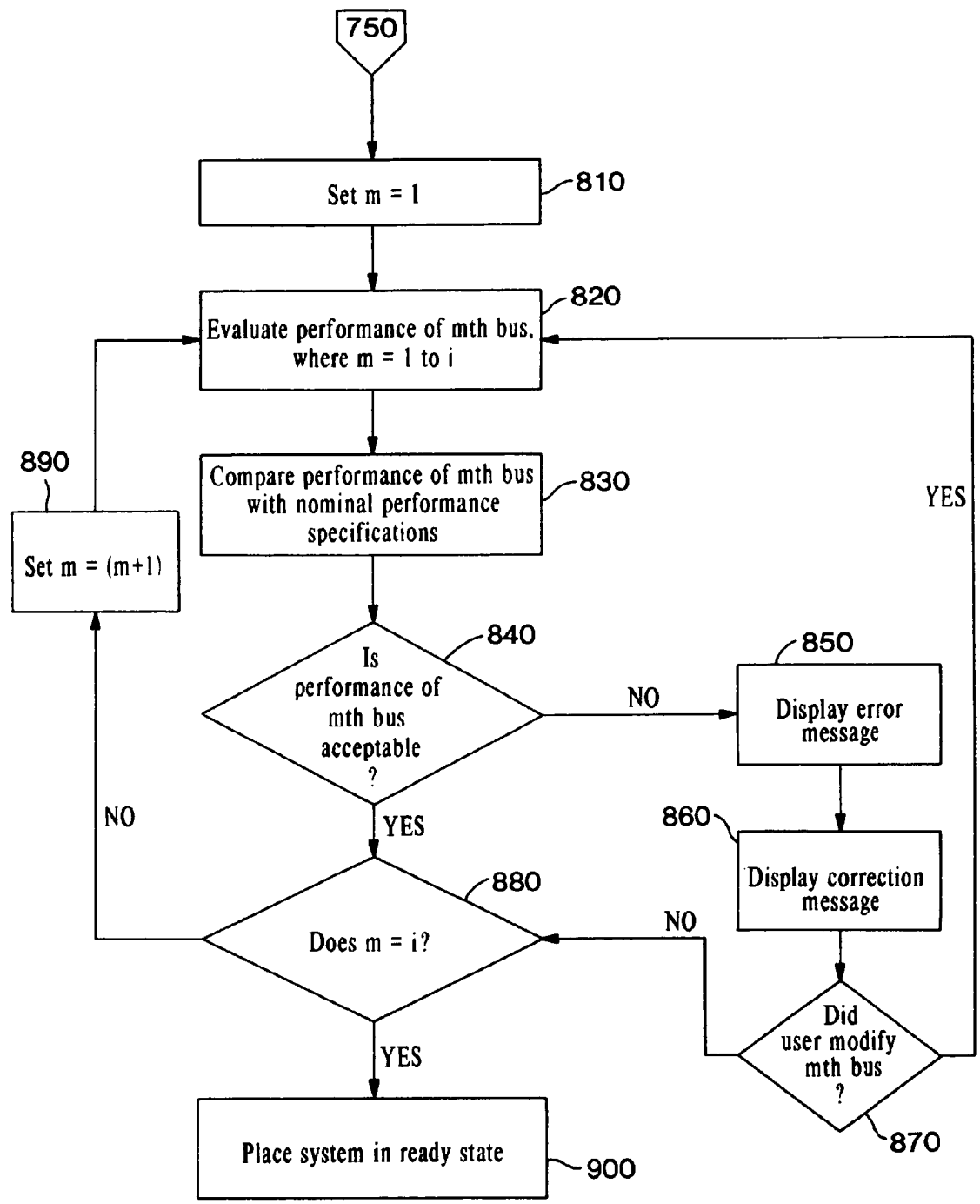
FIG. 6 is a flow chart summarizing the steps in Applicants' method to evaluate using the selected system configuration the performance of each bus disposed within Applicants' data storage and retrieval system.

Referring now to FIGS. 5 and 6, after selecting and invoking a known valid system configuration host computer 110 (FIG. 1) then evaluates the performance of each of the h I/O devices, and evaluates the performance of defined portions of each of the m buses, operational under the selected system configuration. In step 720, host computer 110 evaluates the performance of a designated I/O device, such as I/O device 250 (FIG. 2) using the selected system configuration. In step 820, host computer 110 evaluates the performance of a host bus adapter 210 and communication link 350.

In evaluating the performance of I/O device 250 and its interconnection to the system, host computer 110 stresses I/O device 250 and the interconnections between device 250 and host computer 110, i.e. first host bus adapter 210 (FIG. 2), second host bus adapter 220, communication link 350, and communication link 360. By "stressing" these components, Applicants mean that host computer 110 provides third information to device 250 via first bus 410 and/or second bus 420, and receives fourth information from device 250 via first bus 410 and/or second bus 420, using the maximum data transfer rate possible under the selected system configuration.

Third information comprises a mixture of commands to evaluate the performance of device 250, first bus 410, and second bus 420 during all phases of device/bus operation. As those skilled in the art will appreciate, these phases include arbitration of conflicting device requests for bus access, device/bus selection, data transfer, command transmission and reception, and message transmission and reception.

Third information includes, for example, a series of connect commands interspersed with a series of disconnect commands. By connect commands, Applicants mean commands that do not require the I/O device to disconnect from the bus. Such connect commands include read buffer commands, write buffer commands, and other data transfer commands. As those skilled in the art will appreciate, read/write buffer commands do not require media to be loaded.

By disconnect commands, Applicants mean commands that cause an I/O device to disconnect, assemble data, reconnect, and communicate that data. Such disconnect commands include log sense commands, mode sense commands, and the like. Those skilled in the art will appreciate that log sense commands comprise control commands that cause an I/O device to retrieve data regarding that device's performance.

Mode sense commands comprise control commands that causes a device to report its current settings.

Fourth information includes device status information, transmitted data, bus access requests, and the like. In step 720, host computer 110 provides third information to device 250, and receives fourth information from device 250, using first host bus adapter 210 (FIG. 2) and first bus 410 (FIG. 2) for first time period P1 beginning at a first time T1 and ending at a second time T2. Applicants have found that the duration of this first time period should be at least ten seconds.

Host computer 110 then provides fifth information to, and receives sixth information from, device 250 using second host bus adapter 220 (FIG. 2) and link 360 for second time period P2 beginning at a third time T3 and ending at a fourth time T4. The duration of second time period P2 is at least ten seconds.

Applicants have found that a ten second duration for first time period P1 and second time period P2 is sufficient to evaluate the performance of most I/O devices and interconnecting buses. In certain circumstances, however, a longer evaluation period is needed. Therefore, in certain embodiments of Applicants' method the durations of first time period P1 and second time period P2 are user programmable.

Host computer 110 then simultaneously provides third and fifth information to, and receives fourth and sixth information from, device 250 using first host bus adapter 210/link 350 and second host bus adapter 220/link 360, respectively. During a third time period P3, first time period P1 is adjusted to coincide with second time period P2, i.e. first time T1 equals third time T3 and second time T2 equals fourth time T4. In certain embodiments, the duration of third time period P3 is about ten seconds. During a fourth time period P4, first time period P1 is adjusted to partially overlap with second time period P2.

In step 720 host computer 110 analyzes the fourth information received during first time period P1, the sixth information received during second time period P2, the fourth and sixth information received during third time period P3, and the fourth and sixth information received during fourth time period P4. Based upon that analysis, in step 720 host computer 110 generates seventh information comprising a quantification of the performance of I/O device 250.

In step 730, host computer 110 compares seventh information to first information and/or second information comprising nominal performance specifications for device 250. In the event the performance of device 250 is determined to be unacceptable in step 740, then in step 760 host computer 110 displays an error message regarding that unacceptable performance. In certain embodiments, the first information resident in host computer 110 includes one or more corrective actions that can be taken to enhance the performance of device 250. In these embodiments host computer 110 in step 770 displays one or more correction messages. In step 780, host computer 110 ascertains if the user elected to replace or modify device 250. In the event the user replaces or modifies device 250, then Applicants' method loops to step 720 and again evaluates the performance of that modified/replaced device.

On the other hand, if the user elects not to repair/replace device 250 in step 780, or in the event the performance of device 250 is determined to be acceptable in step 740, host computer 110 then determines whether the performance of each of the I/O devices has been evaluated. The performance of each individual I/O device operational under the selected system configuration is evaluated using the method summarized in FIG. 5.

Referring again to FIG. 6, in step 820 host computer 110 provides third information via first bus 410 to all the I/O devices interconnected to first bus 410, and receives fourth information from all those I/O devices interconnected to first bus 410. Host computer 110 also provides fifth information via second bus 420 to all the I/O devices interconnected to second bus 420, and receives sixth information from all those I/O devices interconnected to second bus 420. Host computer 110 then generates eighth information comprising a quantification of the performance of first bus 410, and ninth information comprising a quantification of the performance of second bus 420.

In step 830, host computer 110 compares eighth information to first information and/or second information comprising nominal performance specifications for first bus 410. In the event the performance of first bus 410 is determined to be unacceptable in step 840, then in step 850 host computer 110 displays an error message regarding that unacceptable performance. In certain embodiments, first information resident in host computer 110 includes one or more corrective actions that can be taken to enhance the performance of first bus 410. In these embodiments host computer 110 in step 860 displays one or more correction messages. In step 870, host computer 110 ascertains if the user elected to modify first bus 410. In the event the user modifies first bus 410, then Applicants' method loops to step 820 and again evaluates the performance of that modified first bus 410.

On the other hand, if the user elects not to modify first bus 410 in step 870, or in the event the performance of first bus 410 is determined to be acceptable in step 840, host computer 110 then determines whether the performance of each of the m buses have been evaluated. The performance of each bus operational under the selected system configuration is individually evaluated using the method summarized in FIG. 6.

After the performance of each of the I/O devices operational under the selected system configuration is individually validated in accord with Applicants' method summarized in FIG. 5, and after the performance of each of the interconnections operational under the selected system configuration is individually validated in accord with Applicants' method summarized in FIG. 6, Applicants' data storage and retrieval system is placed in a fully operational ready mode in step 900.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to evaluate the performance of input/output devices and interconnecting buses disposed in a data storage and retrieval system, wherein said data storage and retrieval system comprises a host computer comprising a first host bus adapter and a second host bus adapter, first information comprising one or more valid system configurations, and second information comprising an apparent system configuration, said method comprising the steps of:

supplying a library external to said host computer, wherein said library comprises a plurality of input/output devices, a plurality of data storage media disposed in a plurality of data storage cartridges which are stored in a plurality of storage slots, and one or more accessors to retrieve, transport, and insert, said plurality of data storage cartridges in said plurality of input/output devices, supplying a first bus connecting said first host bus adapter to each of said plurality of input/output devices;

supplying a second bus connecting said second host bus adapter to each of said plurality of input/output devices;

providing third information via said first bus to one of said plurality of input/output devices, wherein said third information comprises a series of connect commands interspersed with a series of disconnect commands, wherein said connect commands are selected from the group consisting of read buffer commands and write buffer commands;

receiving fourth information via said first bus from said one of said plurality of input/output devices, wherein said fourth information comprises device status information, transmitted data, and bus access requests;

evaluating-the performance of said first bus;

comparing the performance of said first bus with nominal performance specifications for said first bus;

when determining that the performance of said first bus is not acceptable, displaying an error message on said host computer;

when determining that the performance of said first bus is acceptable, placing said data storage and retrieval system in a ready state.

2. The method of claim 1, further comprising the steps of:

comparing the performance of said one of said plurality of input/output devices with nominal performance specifications for said plurality of input/output devices;

when determining that the performance of said one of said plurality of input/output devices is not acceptable, displaying an error message on said host computer;

when determining that the performance of said one of said plurality of input/output devices is acceptable, placing said data storage and retrieval system in a ready state.

3. The method of claim 1, wherein said providing third information step further comprises providing said third information at a first maximum data transfer rate.

4. The method of claim 3, further comprising the steps of:

providing said third information via said first bus to each of said plurality of input/output devices; and receiving said fourth information via said first bus from each of said plurality of input/output devices.

5. The method of claim 4, wherein said data retrieval system further comprises a second bus having a second maximum data transfer rate, said method further comprising the steps of:

providing fifth information via said second bus to said one of said plurality of input/output devices;

receiving sixth information via said second bus from said one of said plurality of input/output devices;

analyzing said sixth information; and evaluating the performance of said second bus.

6. The method of claim 5, wherein said fifth information is selected from the group consisting of connect commands, disconnect commands, and combinations thereof.

7. The method of claim 6, further comprising the steps of:

providing said fifth information via said second bus to each of said plurality of input/output devices; and receiving said sixth information via said second bus from each of said plurality of input/output devices.

8. A data storage and retrieval system a computer readable medium having computer readable program code disposed therein for evaluating the performance of input/output devices and interconnecting buses disposed within a data storage and retrieval system, wherein said data storage and retrieval system comprises a host computer comprising a first host bus adapter and a second host bus adapter, and a library external to said host computer comprising a plurality of input/output devices, a plurality of data storage media disposed in a plurality of data storage cartridges which are stored in a plurality of storage slots, and one or more accessors to retrieve, transport, and insert, said plurality of data storage cartridges in said plurality of input/output devices, said data storage and retrieval system further comprising a first bus connecting said first host bus adapter to each of said plurality of input/output devices, a second bus connecting said second host bus adapter to each of said plurality of input/output devices, first information comprising one or more valid system configurations, and second information comprising an apparent system configuration, the computer readable program code comprising a series of computer readable program steps to effect:

providing to one of said plurality of input/output devices third information via said first bus, wherein said third information comprises a series of connect commands interspersed with a series of disconnect commands, wherein said connect commands are selected from the group consisting of read buffer commands and write buffer commands;

receiving from said one of said plurality of input/output devices fourth information via said first bus;

analyzing said fourth information, wherein said fourth information comprises device status information, transmitted data, and bus access requests;

evaluating the performance of said first bus;

comparing the performance of said first bus with nominal performance specifications for said first bus;

when determining that the performance of said first bus is not acceptable, displaying an error message on said host computer;

when determining that the performance of said first bus is acceptable, placing said data storage and retrieval system in a ready state.

9. The data storage and retrieval system of claim 8, said computer readable program code further comprising a series of computer readable program steps to effect:

comparing the performance of said one of said plurality of input/output devices with nominal performance specifications for said plurality of input/output devices;

when determining that the performance of said one of said plurality of input/output devices is not acceptable, displaying an error message;

when determining that the performance of said one of said plurality of input/output devices is acceptable, placing said data storage and retrieval system in a ready state.

10. The data storage and retrieval system of claim 9, wherein said providing step further comprises providing said third information at said first maximum data transfer rate.

11. The data storage and retrieval system of claim 9, wherein said computer readable program code further comprises a series of computer readable program steps to effect providing said third information at said first maximum data transfer rate.

12. The data storage and retrieval system of claim 11, wherein said computer readable program code further comprises a series of computer readable program steps to effect:

providing said third information via said first bus to each of said plurality of input/output devices; and receiving said fourth information via said first bus from each of said plurality of input/output devices.

13. The data storage and retrieval system of claim 12, further comprising a second bus having a second maximum data transfer rate, wherein said computer readable program code further comprises a series of computer readable program steps to effect:

providing fifth information via said second bus to said plurality of input/output devices;

receiving sixth information via said second bus from said plurality of input/output devices;

analyzing said sixth information; and evaluating the performance of said second bus.

14. The data storage and retrieval system of claim 13, wherein said fifth information is selected from the group consisting of connect commands, disconnect commands, and combinations thereof.

15. The data storage and retrieval system of claim 14, wherein said computer readable program code further comprises a series of computer readable program steps to effect:
providing said fifth information via said second bus to each of said plurality of input/output devices; and
receiving said sixth information via said second bus from each of said plurality of input/output devices.

16. A computer program product encoded to an information storage medium and having computer readable program code embodied therein, said computer program product being usable with a programmable computer processor for evaluating the performance of input/output devices and interconnecting buses disposed within a data storage and retrieval system, wherein said data storage and retrieval system comprises a host computer comprising a first host bus adapter and a second host bus adapter, and a library external to said host computer comprising a plurality of input/output devices, a plurality of data storage media disposed in a plurality of data storage cartridges which are stored in a plurality of storage slots, and one or more accessors to retrieve, transport, and insert, said plurality of data storage cartridges in said plurality of input/output devices, said data storage and retrieval system further comprising a first bus to each of said plurality of input/output devices, a second bus connecting said second host bus adapter to each of said plurality of input/output devices, first information comprising one or more valid system configurations, and second information comprising an apparent system configuration, comprising:
computer readable program code which causes said programmable computer processor to provide third information via said first bus to one of said plurality of input/output devices, wherein said third information comprises a series of connect commands interspersed with a series of disconnect commands, wherein said connect commands are selected from the group consisting of read buffer commands and write buffer commands;
computer readable program code which causes said programmable computer processor to receive fourth information via said first bus from said one of said plurality of input/output devices, wherein said fourth information comprises device status information, transmitted data, and bus access requests;
computer readable program code which causes said programmable computer processor to compare the performance of said first bus with nominal performance specifications for said first bus;
computer readable program code which causes said programmable computer processor to determine that the performance of said first bus is not acceptable and to display an error message on said host computer;
computer readable program code which causes said programmable computer processor to determine that the performance of said first bus is acceptable and to place said data storage and retrieval system in a ready state.

17. The computer program product of claim 16, further comprising:
computer readable program code which causes said programmable computer processor to compare the performance of said one of said plurality of input/output devices with nominal performance specifications for said plurality of input/output devices;
computer readable program code which causes said programmable computer processor to determine that the performance of said plurality of input/output devices is not acceptable and to display an error message on said host computer;
computer readable program code which causes said programmable computer processor to determine that the performance of said plurality of input/output devices is acceptable and to place said data storage and retrieval system in a ready state.

18. The computer program product of claim 17, further comprising:
computer readable program code which causes said programmable computer processor to provide said third information via said first bus to each of said plurality of input/output devices; and
computer readable program code which causes said programmable computer processor to receive said fourth information via said first bus from each of said plurality of input/output devices.

19. The computer program product of claim 18, wherein said data storage and retrieval system further comprises a second bus having a second maximum data transfer rate, further comprising:
computer readable program code which causes said programmable computer processor to provide fifth information via said second bus to said plurality of input/output devices;
computer readable program code which causes said programmable computer processor to receive sixth information via said second bus from said plurality of input/output devices;
computer readable program code which causes said programmable computer processor to analyze said sixth information; and
computer readable program code which causes said programmable computer processor to evaluate the performance of said second bus;
wherein said fifth information is selected from the group consisting of connect commands, disconnect commands, and combinations thereof.

20. The computer program product of claim 19, further comprising:
computer readable program code which causes said programmable computer processor to provide said fifth information via said second bus to each of said plurality of input/output devices; and
computer readable program code which causes said programmable computer processor to receive said sixth information via said second bus from each of said plurality of input/output devices.

* * * * *